US012752635B2

(12) United States Patent
Jammulamadaka

(10) Patent No.: US 12,752,635 B2
(45) Date of Patent: Oct. 6, 2026

(54) TECHNIQUES FOR ESTIMATING ACTIVE ELECTRIC MOTOR DAMPING TORQUE FOR ELECTRIFIED VEHICLES

(71) Applicant: FCA US LCC, Auburn Hills, MI (US)

(72) Inventor: Anand Jammulamadaka, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 154 days.

(21) Appl. No.: 18/755,772

(22) Filed: Jun. 27, 2024

(65) Prior Publication Data

US 2026/0001410 A1 Jan. 1, 2026

(51) Int. Cl.
*B60L 15/20* (2006.01)

(52) U.S. Cl.
CPC ......... *B60L 15/20* (2013.01); *B60L 2240/421* (2013.01); *B60L 2240/423* (2013.01); *B60L 2240/486* (2013.01)

(58) Field of Classification Search
None
See application file for complete search history.

(56) References Cited

U.S. PATENT DOCUMENTS 7,024,290 B2 4/2006 Zhao et al.
7,577,507 B2 8/2009 Morris
9,446,757 B2 * 9/2016 Liang ........................ B60K 6/48
11,268,582 B2 3/2022 Ravichandran et al.
11,707,987 B1 * 7/2023 Nair ........................ G10K 15/02 701/22
2012/0262102 A1 10/2012 Gee et al.
2014/0257617 A1 9/2014 Klymenko et al.
2023/0188067 A1 * 6/2023 Shinohara ............... H02P 21/05 318/432

* cited by examiner

*Primary Examiner* — James J Lee
*Assistant Examiner* — Jonathan E Reinert
(74) *Attorney, Agent, or Firm* — Jeremy J. Klobucar

(57) ABSTRACT

An active electric motor damping (AEMD) calibration and control system for an electrified vehicle includes an external computing system that is separate from the electrified vehicle and is configured to execute a virtual model to simulate operation of the electrified vehicle in a plurality of different operating modes, wherein the electrified powertrain includes an electric motor configured to generate drive torque that is transferred to the driveline and determine, using the virtual model to, a set of optimized parameters, for each of the plurality of different operating modes of the electrified vehicle, for AEMD control of the electric motor, and a control system of the electrified vehicle, the control system being configured to receive, from the external computing system, the sets of optimized parameters and control the electric motor based on the sets of optimized parameters to perform AEMD control.

12 Claims, 5 Drawing Sheets

TECHNIQUES FOR ESTIMATING ACTIVE ELECTRIC MOTOR DAMPING TORQUE FOR ELECTRIFIED VEHICLES

FIELD

The present application generally relates to electrified vehicles and, more particularly, to techniques for estimating active electric motor damping (AEMD) torque for electrified vehicles.

BACKGROUND

An electrified vehicle includes at least one electric motor configured to generate torque that is provided to a driveline for vehicle propulsion. During transient maneuvers, such as accelerator pedal tip-in, motor drive torque changes suddenly and can cause undesirable driveline vibrations. To compensate for this, active electric motor damping (AEMD) measures the electric motor's speed and uses it to calculate a damping torque to be applied to the motor. Conventional calibration or optimization of a set of parameters for AEMD control is timely and complex as that it requires a working implementation of the electrified powertrain—i.e., the electric motor(s)—and gathering data generated during various on-road driving maneuvers. This effectively limits the time to calibrate the AEMD system to an end of the vehicle development process, which is undesirable. Accordingly, while such conventional AEMD systems do work well for their intended purpose, there exists an opportunity for improvement in the relevant art.

SUMMARY

In one exemplary implementation, an active electric motor damping (AEMD) calibration and control system for an electrified vehicle is presented. In one exemplary implementation, the AEMD calibration and control system comprises an external computing system that is separate from the electrified vehicle and is configured to execute a virtual model to simulate operation of the electrified vehicle in a plurality of different operating modes, wherein the electrified vehicle includes an electrified powertrain comprising an electric motor configured to generate drive torque that is transferred to a driveline, and determine, using the virtual model to, a set of optimized parameters, for each of the plurality of different operating modes of the electrified vehicle, for AEMD control of the electric motor, and a control system of the electrified vehicle, the control system being configured to receive, from the external computing system, the sets of optimized parameters and control the electric motor based on the sets of optimized parameters to perform AEMD control.

In some implementations, the AEMD control involves determining a measured speed of the electric motor, passing the measured speed through a low-pass filter and then through a high-pass filter to obtain a filtered speed, and applying a gain value to the filtered speed to obtain an AEMD torque that is summed with a commanded motor torque. In some implementations, the set of optimized parameters includes (i) a cutoff frequency of the low-pass filter, (ii) a cutoff frequency of the high-pass filter, and (iii) the gain value. In some implementations, the set of optimized parameters further includes non-constant or variable AEMD torque margins for corresponding varying operating conditions of the electrified vehicle. In some implementations, the external computing system is configured to determine the cutoff frequencies of the low-pass and high-pass filters based on a three cycle average of a time-series signal of motor speed versus time.

In some implementations, the external computing system is configured to determine the gain value by approximating the virtual model as a simplified two degree-of-freedom (DOF) two inertia, spring system. In some implementations, the external computing system is configured to use the simplified two DOF two inertia, spring system to determine the gain value ($P_{AEMD}$) as:

$$P_{AEMD} = -2\omega_n(1 - \xi_{Driveline})J_{Tot},$$

where $J_{Tot}$ is a total inertia of the electrified powertrain, the driveline, and the vehicle at a location of the electric motor, $\omega_n$ is a natural frequency of the driveline, and $\xi_{Driveline}$ is a damping ratio of the driveline. In some implementations, the damping ratio of the driveline $\xi_{Driveline}$ is calculated based on a stiffness of the driveline ( ), which is calculatable as follows:

$$K_{Driveline} = J_{Tot} * (\omega_n)^2.$$

In some implementations, the electric motor is associated with a rear axle of the driveline, and wherein the electrified powertrain further comprises another electric motor associated with a front axle of the driveline.

According to another example aspect of the invention, an AEMD calibration and control method for an electrified vehicle is presented. In one exemplary implementation, the AEMD calibration and control method comprises executing, by an external computing system that is separate from the electrified vehicle, a virtual model to simulate operation of the electrified vehicle in a plurality of different operating modes, wherein the electrified vehicle includes an electrified powertrain comprising an electric motor configured to generate drive torque that is transferred to a driveline, determining, by the external computing system and using the virtual model to, a set of optimized parameters, for each of the plurality of different operating modes of the electrified vehicle, for AEMD control of the electric motor, and outputting, from the external computing system to a control system of the electrified vehicle, the sets of optimized parameters, wherein receipt of the sets of optimized parameters cause the control system to control the electric motor based on the sets of optimized parameters to perform AEMD control.

In some implementations, the AEMD control involves determining a measured speed of the electric motor, passing the measured speed through a low-pass filter and then through a high-pass filter to obtain a filtered speed, and applying a gain value to the filtered speed to obtain an AEMD torque that is summed with a commanded motor torque. In some implementations, the set of optimized parameters includes (i) a cutoff frequency of the low-pass filter, (ii) a cutoff frequency of the high-pass filter, and (iii) the gain value. In some implementations, the set of optimized parameters further includes non-constant or variable AEMD torque margins for corresponding varying operating conditions of the electrified vehicle. In some implementations, the determining of the cutoff frequencies of the low-pass and high-pass filters is performed based on a three cycle average of a time-series signal of motor speed versus time.

In some implementations, the determining of the gain value is performed by approximating the virtual model as a simplified two degree-of-freedom (DOF) two inertia, spring system. In some implementations, the external computing system is configured to use the simplified two DOF two inertia, spring system to determine the gain value ($P_{AEMD}$) as:

$$P_{AEMD} = -2\omega_n(1 - \xi_{Driveline})J_{Tot},$$

where $J_{Tot}$ is a total inertia of the electrified powertrain, the driveline, and the vehicle at a location of the electric motor, $\omega_n$ is a natural frequency of the driveline, and $\xi_{Driveline}$ is a damping ratio of the driveline. In some implementations, the damping ratio of the driveline $\xi_{Driveline}$ is calculated based on a stiffness of the driveline ( ), which is calculatable as follows:

$$K_{Driveline} = J_{Tot} * (\omega_n)^2.$$

In some implementations, the electric motor is associated with a rear axle of the driveline, and wherein the electrified powertrain further comprises another electric motor associated with a front axle of the driveline.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, active electric motor damping (AEMD) measures an electric motor's speed and uses it to calculate a damping torque to be applied to the motor. In one example AEMD system of the present application, the measured speed is passed through a series of low and high pass filters before it is multiplied by a gain to calculate a final AEMD damping torque that is added to a commanded electric motor torque. Conventional calibration of these filters and this gain would be timely and complex as that it requires a working implementation of the electrified powertrain—i.e., the electric motor(s)—and gathering data generated during various on-road driving maneuvers. In other words, without the availability of the actual hardware, the calibration of the AEMD system cannot proceed. This could potentially increase vehicle development time. In addition, torque margins allocated to AEMD torques within the vehicle's software will not be readily verifiable, and any effect of over or under allocation of torque margins to AEMD torques within the vehicle's software on the drive quality and/or fuel economy will not be known. Accordingly, improved AEMD calibration and control systems and methods for electrified vehicles are presented herein.

These improved techniques involve using a virtual model to simulate an electrified powertrain and, more particularly, electric motor torque, during simulated drivability maneuvers. The model sufficiently represents the torsional drivetrain (including all necessary inertias, compliances, gear ratios, lash, losses, etc.) connecting the electric motor and any other primary torque sources (other electric motor(s), an engine, etc.) to the vehicle's wheels and a vehicle representation (mass, center-of-gravity (CG), suspensions and tire compliances, mounts, traction, road loads, etc.) to capture the articulation of the vehicle under wheel torques, such as to estimate seat track acceleration. Using this model, the cutoff frequencies for the low/high pass filters and the gain for the AEMD torque determination can be determined. This process can be performed early during vehicle development (i.e., before obtaining the actual powertrain hardware), thereby saving time and costs, and provides the ability to fully assess drivability and fuel economy impact and to define complex (i.e., non-constant) AEMD torque margin schemes for improved performance.

Figure 1A:
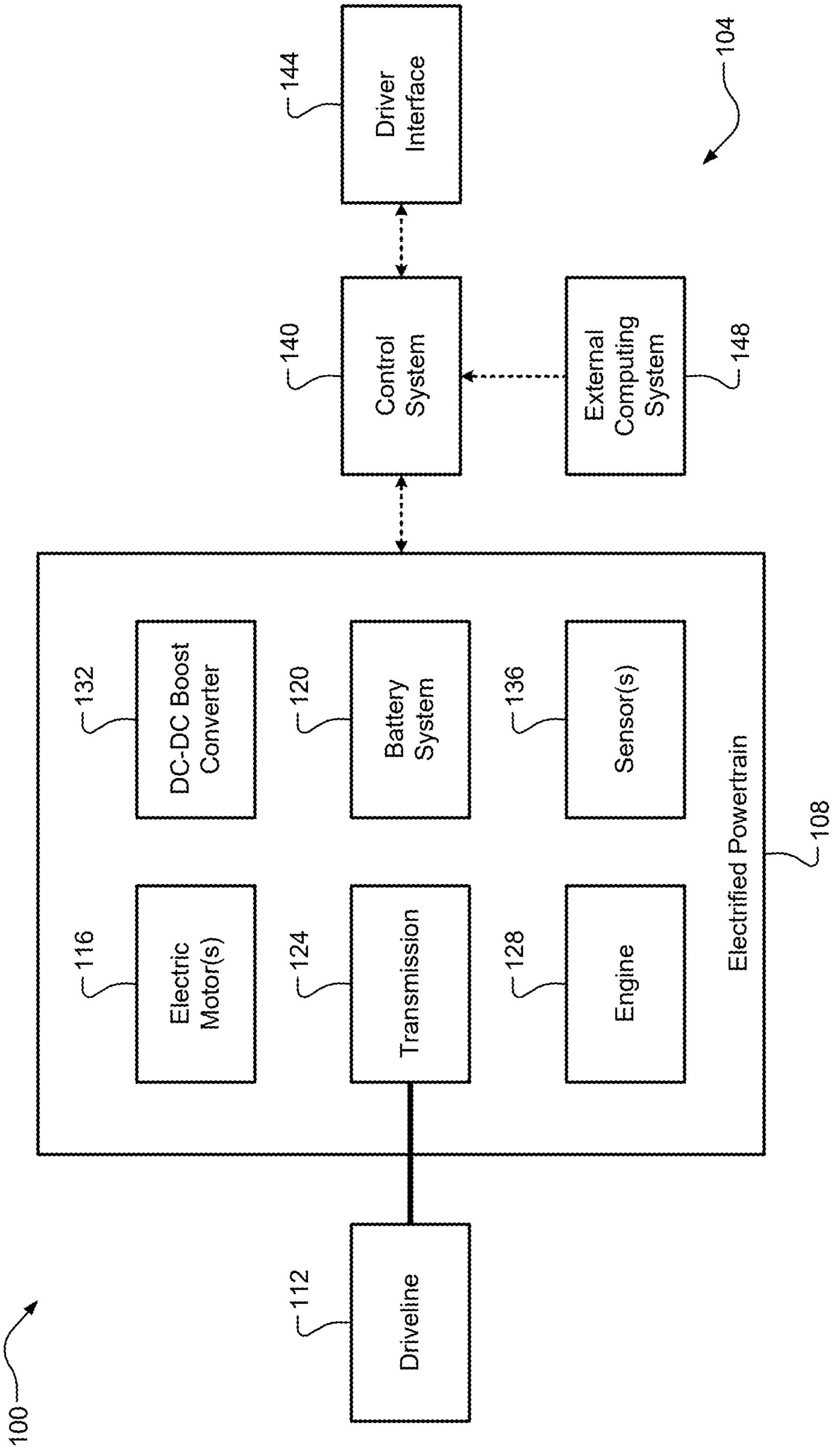
FIGS. 1A-1B are functional block diagrams of an electrified vehicle and an example active electric motor damping (AEMD) control system according to the principles of the present application.

Referring now to FIG. 1A, a functional block diagram of an electrified vehicle 100 (also "vehicle 100") having an AEMD calibration and control system 104 according to the principles of the present application is illustrated. The electrified vehicle 100 comprises an electrified powertrain 108 that is configured to generate and transfer torque to a driveline 112 for vehicle propulsion. The electrified powertrain 108 generally comprises one or more electric motors 116 powered by a battery system 120 (e.g., a high voltage battery pack). The electric motor(s) 116 are configured to generate torque that is transferred to the driveline 112 via a gear reducer or transmission 124, such as a multi-speed automatic transmission. In some implementations, the electrified powertrain 108 could also include an internal combustion engine 128 configured for propulsion and/or for electrical energy generation and recharging of the battery system 120. In one exemplary implementation, the electrified powertrain 108 includes two electric motors (e.g., motor A and motor B) configured in any suitable configuration (e.g., one electric motor per driveline axle).

The electrified powertrain 108 also includes a DC-DC converter 132 that is configured to step-up or boost a first voltage of the battery system 120 to a higher second voltage. This additional voltage could be used, for example, as part of the AEMD control techniques of the present application. The DC-DC converter 132 could also be configured to step-down or buck the first voltage of the battery system 120 to a lower third voltage, such as for recharging a low voltage (e.g., 12V) battery system and/or powering low voltage accessory loads. The electrified powertrain 108 also includes a set of one or more sensors 136 configured to measure various operating parameters of the vehicle 100. Non-limiting examples of these operating parameters include motor speed, motor torque, vehicle speed, and battery system voltage. While shown as part of the electrified powertrain 108, it will be appreciated that the sensor(s) 136 could be external to the electrified powertrain 108. It will also be appreciated that the electrified powertrain 108 could include other non-illustrated components, such as the low voltage battery system, actuators or actuator systems, an on-board or integrated dual charging module (OBCM/IDCM), and the like.

A control system 140 comprising one or more controllers or electronic control units (ECUs) is configured to control operation of the vehicle 100. This primarily includes controlling the electrified powertrain 108 to generate an amount of drive torque to satisfy a torque request received from a driver via a driver interface 144 (e.g., an accelerator pedal). The control system 140 is also configured to perform at least a portion of the AEMD control techniques of the present application. Calibration by the AEMD calibration and control system 104, including the determination of optimal filter cutoff frequencies and gain, could be performed by an external calibration system 148. This external calibration system 148 is a separate (offline) computing system that is used to virtually simulate the operation and dynamics of the electrified vehicle 100 and, in particular, the electric motor 116 and the driveline 112. Once these AEMD parameters are determined and optimized, they are uploaded into the control system 140 for subsequent use to perform real-time (online) AEMD.

Figure 1B:
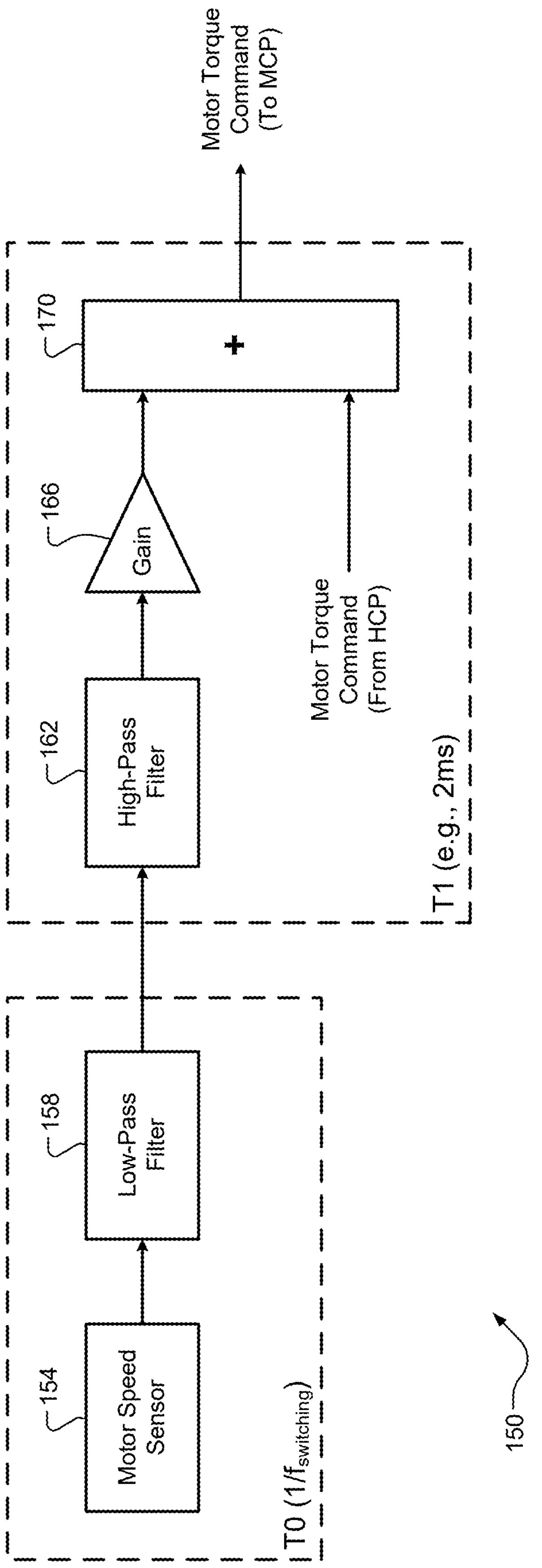

Referring now to FIG. 1B and with continued reference to FIG. 1A, a functional block diagram of a portion 150 of the AEMD calibration and control system 104 (also, "AEMD system 150") according to some implementations of the present application is illustrated. As shown, the AEMD system 150 includes a motor speed sensor 154, a low-pass filter 158, a high-pass filter 162, a gain 166, and a summation block 170. The motor speed sensor 154 (e.g., one of the set of sensors 136) is configured to measure a position (e.g., change in position over time) or a rotational speed of the electric motor 116. The motor speed signal is provided to a low-pass filter 158, which passes a portion of the motor speed signal below a first cutoff frequency. The motor speed sensor 154 and the low-pass filter 158 could both operate at a period TO, which is an inverse of a switching frequency $f_{switching}$ ($1/f_{switching}$) of the control system 140. The filtered motor speed signal is provided from the low-pass filter 158 to a high-pass filter 162, which passes a portion of the filtered motor speed signal above a second cutoff frequency.

While a series of low-pass and high-pass filters 154, 162 are shown and described herein, it will be appreciated that a similar suitable filter design could be utilized, such as a bandpass filter defined between the two cutoff frequencies. The filtered motor speed signal is output from the high-pass filter 162 to a gain block 166 that applies a gain multiplier thereto and outputs that signal/value to a summation block 170, which combines the signal/value with an initial motor torque command. This initial motor torque command could be calculated by a hybrid control processor (HCP) or another supervisory controller of the control system 140 and could be based, for example, on a driver torque request. The output of the summation block 170 is a modified or final motor torque command. This final motor torque command could be provided to a motor control processor (MCP) or another motor-specific controller of the control system 140 that is configured to control the electric motor 116. The high-pass filter 162, the gain block 166, and the summation block 170 could operate at a second period T1, which could be, for example only, approximately 2 milliseconds (ms).

Figure 2A:
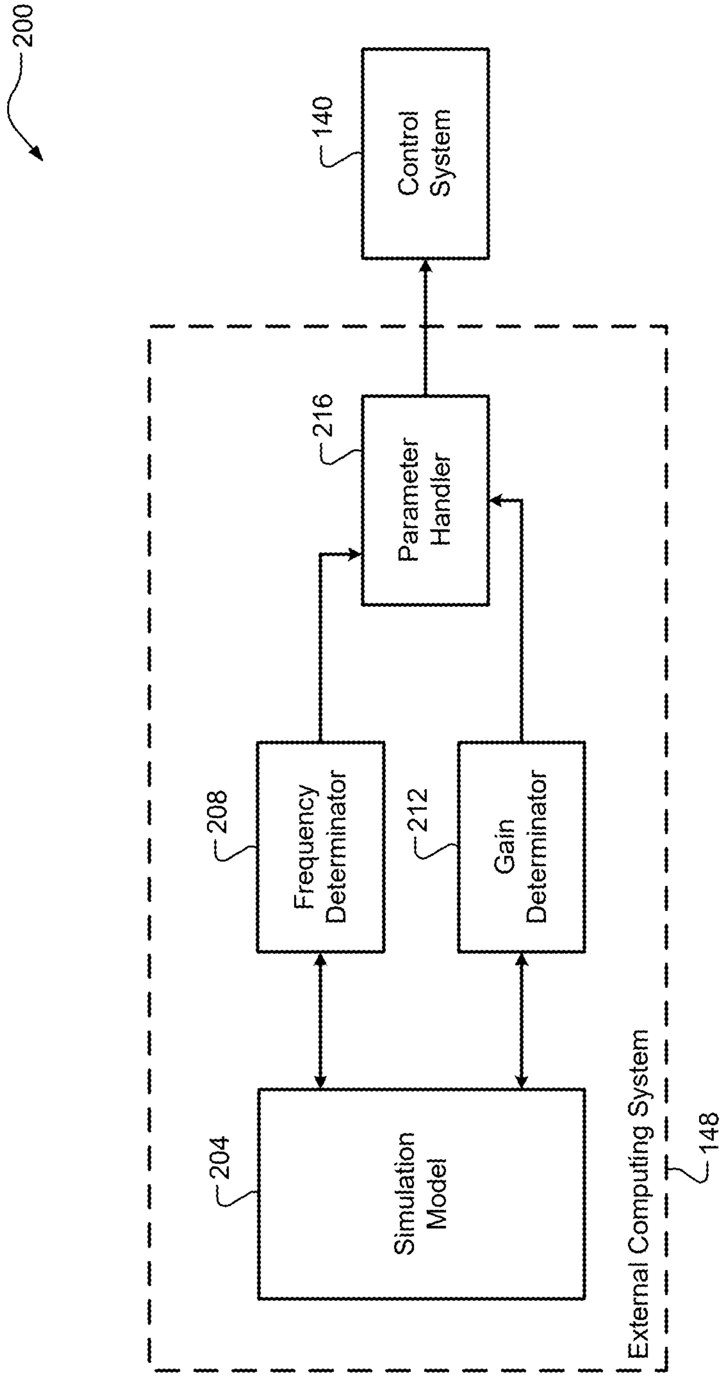
FIGS. 2A-2B are diagrams of an example architecture for the AEMD control system and an example two degree-of-freedom (DOF) two inertia, spring system model according to the principles of the present application.

Referring now to FIG. 2, a functional block diagram of an example system design or architecture 200 for the AEMD calibration and control system 104 according to the principles of the present application is illustrated. The system 200 includes simulation model 204 that is configured to simulate drivability maneuvers of the electrified vehicle 100, including the electrified powertrain 108 and the driveline 112. The simulation model virtual, high-fidelity computer-based model that sufficiently (i) represents the torsional drivetrain (portions of the electrified powertrain 108 and the driveline 112) connecting the electric motor 116 and any other primary torque sources (another electric motor, an engine, etc.) to wheels of the driveline 112 and (ii) represents the electrified vehicle 100 to capture the articulation of the electrified vehicle 100 under wheel torques to accurately estimate seat track acceleration (e.g., felt by a driver or passenger).

As previously mentioned, the modeled torsional drivetrain includes all necessary inertias, compliances, gear ratios, lash, losses, and the like. The modeled vehicle articulation includes accurate vehicle mass, CG, suspension and tire compliances, mounts, traction, road loads, and the like. The simulation model can therefore also be referred to as "a drivetrain-vehicle model" for simulating a plurality of different vehicle drivability maneuvers. The model is used initially to estimate the vibrational frequency in each of a plurality of different gear/configuration/modes of the electrified powertrain 108 and the driveline 112. This could be performed, for example, either through (i) linear analysis, (ii) by calculating eigenvalues, or (iii) through time series signals of the motor speed and half-shaft torques, by taking an average over a certain number of cycles (e.g., three cycles). For example only, a time-series signal could include motor speed versus time and the frequency ($\omega_n$) could be calculated as an average over three cycles (i.e., $\omega_n=3/\Delta t_{3cycle}$). The model 204 is used by a frequency determinator block 208, which is configured to determine the cutoff frequencies for the low and high-pass filters of the AEMD (e.g., low-pass filter 154 and high-pass filter 162).

Figure 2B:
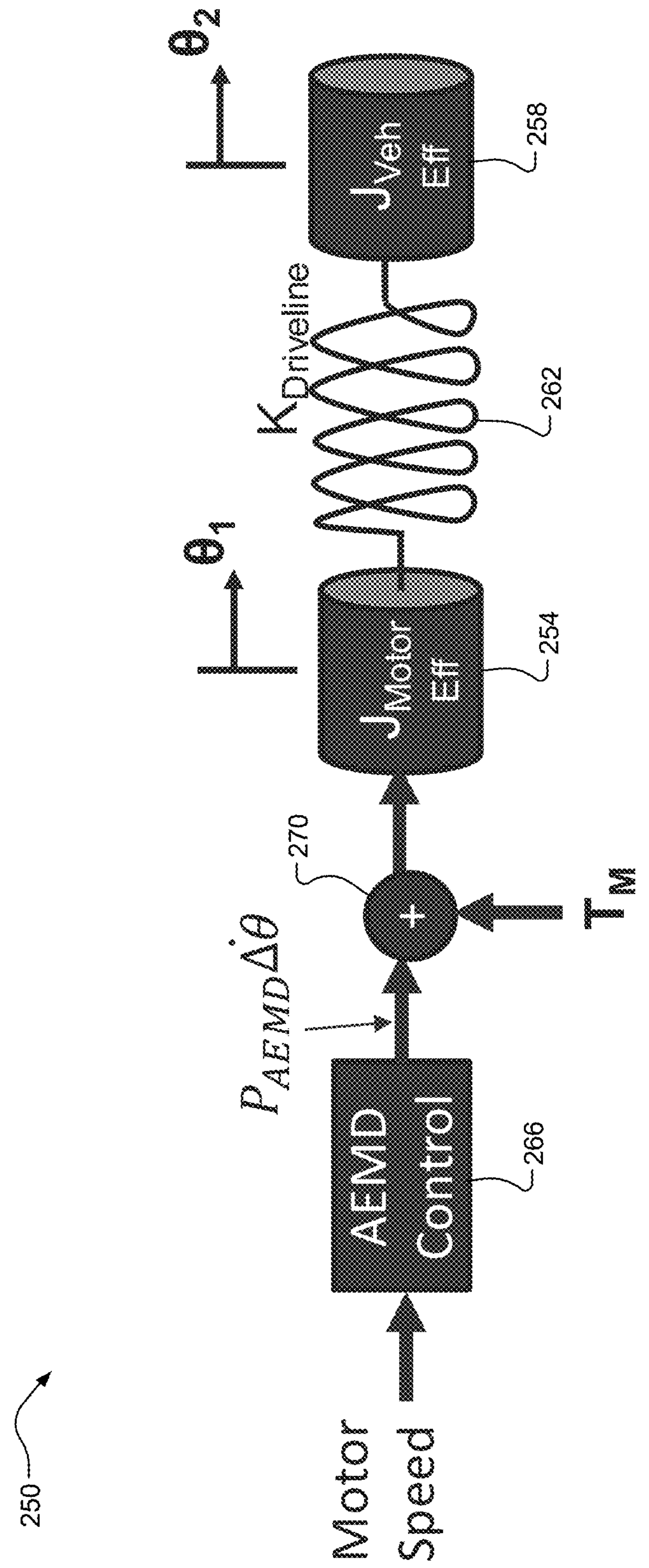

The model 204 is also used by a gain determinator block 212, which is configured to determine the gain multiplier for the gain block of the AEMD (e.g., gain block 166). In one exemplary implementation, the identification or determination of the gain multiplier involves making an approximation of the drivetrain-vehicle model 204 as a simplified two degree-of-freedom (DOF) two inertia, spring system 250 as shown in FIG. 2B and discussed in greater detail below. As shown in FIG. 2B, an effective motor inertia $J_{MotorEff}$ (reference 254) and an effective vehicle inertia $J_{VehEff}$ (reference 258) are connected by a spring 262. The vehicle inertia $J_{VehEff}$ is generally large compared to the effective motor inertia $J_{MotorEff}$, hence its acceleration is neglected. Thereby, the equation of motion for the effective motor inertia $J_{MotorEff}$ can be written as:

$$J_{MotorEff}\Delta\ddot{\theta} + C_{Driveline}\Delta\dot{\theta} + K_{Driveline}\Delta\theta = T_m + P_{AEMD}\Delta\dot{\theta}, \text{ or}$$

$$J_{MotorEff}\Delta\ddot{\theta} + (C_{Driveline} - P_{AEMD})\Delta\dot{\theta} + K_{Driveline}\Delta\theta = T_m,$$

where $C_{Driveline}$ is an effective damping in the driveline 112 at the motor location, $K_{Driveline}$ is an effective stiffness in the driveline 112 at the motor location, $T_m$ is the motor nominal torque limit, $P_{AEMD}$ is the AEMD damping coefficient and $\Delta\theta$ represents a difference between $\theta_1$ and $\theta_2$.

The effective viscous damping ratio ($\xi_{Effective}$) is given by:

$$C_{Effective} = (C_{Driveline} - P_{AEMD}) = 2\omega_n\left(\xi_{Driveline}\frac{J_{Tot}}{J_{MotorEff}} + \xi_{AEMD}\right)J_{MotorEff},$$

$$\text{and } \xi_{Effective} = \left(\xi_{Driveline}\frac{J_{Tot}}{J_{MotorEff}} + \xi_{AEMD}\right),$$

where $J_{Tot}$ is the total inertia of the powertrain 108, driveline 112, and the vehicle 100 at the motor location, $\omega_n$ is the natural frequency of the driveline 112, and $\xi_{AEMD}$ is the damping ratio from the AEMD damping torque. Applying a critical damping requirement (e.g., for achieving a fully-damped response) on the damping ration, we obtain:

$$\xi_{AEMD} = (1 - \xi_{Driveline})\frac{J_{Tot}}{J_{MotorEff}}.$$

The AEMD torque component (AEMDTorque) and the AEMD gain will then be:

$$AEMD\ \text{Torque} = P_{AEMD}\dot{\Delta}\theta = -2\omega_n(1 - \xi_{Driveline})J_{Tot}\dot{\Delta}\theta,$$

$$\text{and } P_{AEMD} = -2\omega_n(1 - \xi_{Driveline})J_{Tot}.$$

The damping naturally present in the driveline 112 can be estimated from the model damping in the driveline mode. The driveline resonance typically has inertias on opposite ends of the half-shaft in opposite phase. Therefore, the effective inertias of the electric motor 116 and the electrified vehicle 100 $J_{MotorEff}$ and $J_{VehEff}$, respectively, can be estimated by reflecting it to the location of the half-shafts. Once we have the effective inertias of the electric motor 116 and the electrified vehicle 100, the driveline stiffness can be estimated using the following relation:

$$K_{Driveline} = J_{Tot} * (\omega_n)^2.$$

Once the effective inertias of the motor, vehicle, and the effective driveline stiffness are known, the AEMD gain can be calculated that gives the fully-damped response. The AEMD gain and control can then be implemented in the full-fidelity model 204 to simulate the response with AEMD.

Figure 3:
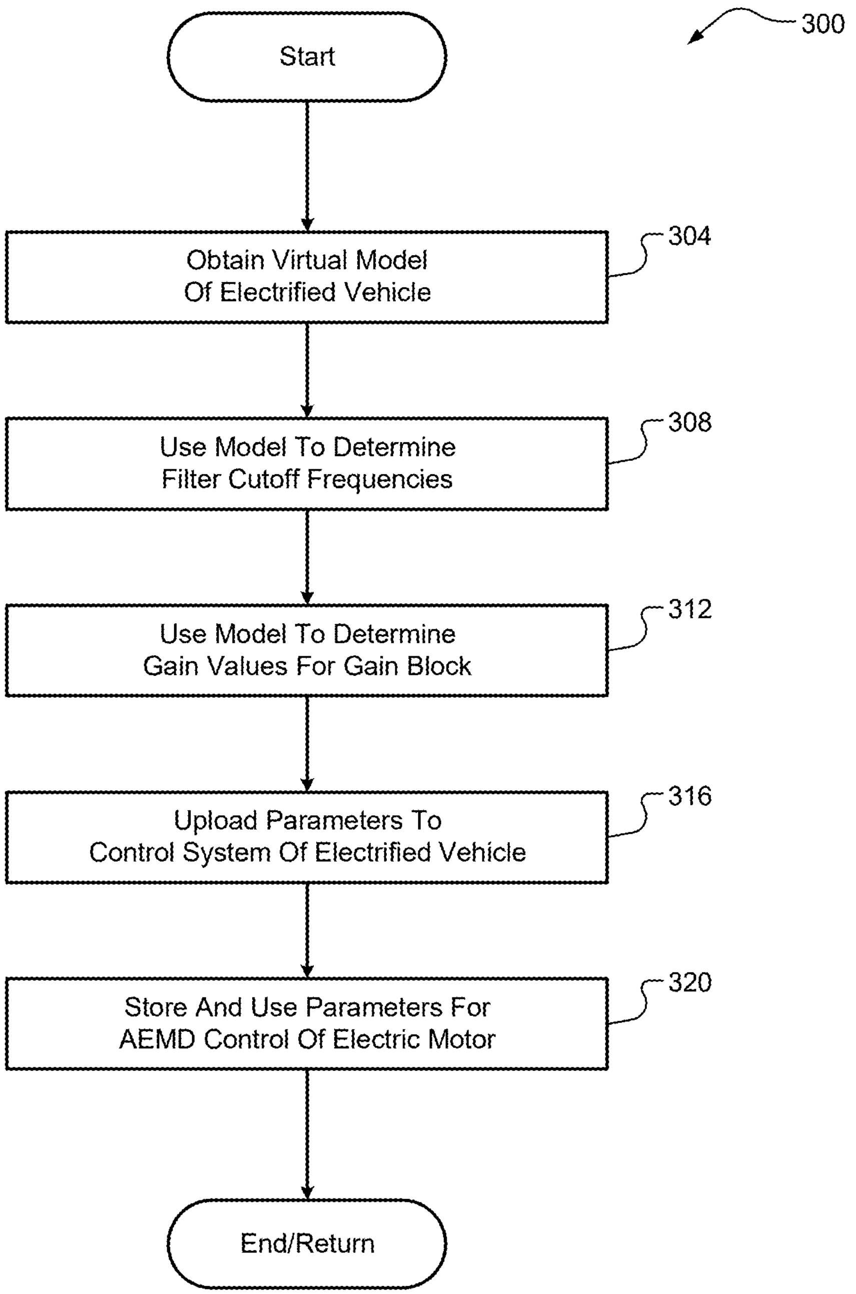
FIG. 3 is a flow diagram of an example AEMD calibration and control method and for an electrified vehicle according to the principles of the present application.

Referring now to FIG. 3, a flow diagram of an example AEMD calibration and control method 300 for an electrified vehicle according to the principles of the present application is illustrated. The method 300 begins at 304. At 304, the external computing system 148 obtains a virtual model (e.g., a drivetrain-vehicle model) for the electrified powertrain 108 and the electrified vehicle 100. At 308, the external computing system 148 uses the virtual model to determine the cutoff frequencies of the low-pass and high-pass filters 158, 162 as previously discussed herein. At 312, the external computing system 148 uses the virtual model to determine the gain value for the gain block 166 as previously discussed herein. It will be appreciated that these steps 308 and 312 could be repeated for each of a plurality of different operating modes (configurations, gear ratios, etc.) of the electrified vehicle 100. At 316, the external computing system 132 uploads the determined sets of parameters (cutoff frequencies, gains, etc.) to the control system 140 of the electrified vehicle 100. At 320, the control system 140 stores the sets of parameters (e.g., in memory) and uses them for subsequent AEMD control (i.e., control of the electric motor 116 to dampen oscillations at the driveline 112). The method 300 then ends.

In yet another aspect of the present application, a method of calibrating or assembling the electrified vehicle 100 is proposed. This method includes obtaining the virtual model and using the virtual model to determine the sets of parameters (cutoff frequencies, gains, etc.) during a period before the actual hardware (i.e., the electric motor 116, the components of the driveline 112, etc.) is actually available. This allows for earlier development of the AEMD control and could also, in some cases, allow for an alteration in the hardware earlier in the development process of the electrified vehicle 100, if absolutely necessary. Once the hardware is then obtained and assembled, the AEMD control could be tested and verified.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An active electric motor damping (AEMD) calibration and control system for an electrified vehicle, the AEMD calibration and control system comprising:

an external computing system that is separate from the electrified vehicle and is configured to:

execute a virtual model to simulate operation of the electrified vehicle in a plurality of different operating modes, wherein the electrified vehicle includes an electrified powertrain comprising an electric motor configured to generate drive torque that is transferred to a driveline, and determine, using the virtual model to, a set of optimized parameters, for each of the plurality of different operating modes of the electrified vehicle, for AEMD control of the electric motor; and a control system of the electrified vehicle, the control system being configured to receive, from the external computing system, the sets of optimized parameters and control the electric motor based on the sets of optimized parameters to perform AEMD control, wherein the AEMD control involves determining a measured speed of the electric motor, passing the measured speed through a low-pass filter and then through a high-pass filter to obtain a filtered speed, and applying a gain value to the filtered speed to obtain an AEMD torque that is summed with a commanded motor torque, and wherein the external computing system is configured to determine the gain value by approximating the virtual model as a simplified two degree-of-freedom (DOF) two inertia, spring system and using the simplified two DOF two inertia, spring system to determine the gain value ($P_{AEMD}$) as:

$$P_{AEMD} = -2\omega_n(1 - \xi_{Driveline})J_{Tot},$$

where $J_{Tot}$ is a total inertia of the electrified powertrain, the driveline, and the vehicle at a location of the electric motor, $\omega_n$ is a natural frequency of the driveline, and $\xi_{Driveline}$ is a damping ratio of the driveline.

2. The AEMD calibration and control system of claim 1, wherein the set of optimized parameters includes (i) a cutoff frequency of the low-pass filter, (ii) a cutoff frequency of the high-pass filter, and (iii) the gain value.

3. The AEMD calibration and control system of claim 2, wherein the set of optimized parameters further includes non-constant or variable AEMD torque margins for corresponding varying operating conditions of the electrified vehicle.

4. The AEMD calibration and control system of claim 2, wherein the external computing system is configured to determine the cutoff frequencies of the low-pass and high-pass filters based on a three cycle average of a time-series signal of motor speed versus time.

5. The AEMD calibration and control system of claim 1, wherein the damping ratio of the driveline $\xi_{Driveline}$ is calculated based on a stiffness of the driveline ($K_{Driveline}$), which is calculatable as follows:

$$K_{Driveline} = J_{Tot} * (\omega_n)^2.$$

6. The AEMD calibration and control system of claim 1, wherein the electric motor is associated with a rear axle of the driveline, and wherein the electrified powertrain further comprises another electric motor associated with a front axle of the driveline.

7. An active electric motor damping (AEMD) calibration and control method for an electrified vehicle, the AEMD calibration and control method comprising:

executing, by an external computing system that is separate from the electrified vehicle, a virtual model to simulate operation of the electrified vehicle in a plurality of different operating modes, wherein the electrified vehicle includes an electrified powertrain comprising an electric motor configured to generate drive torque that is transferred to a driveline;

determining, by the external computing system and using the virtual model to, a set of optimized parameters, for each of the plurality of different operating modes of the electrified vehicle, for AEMD control of the electric motor; and outputting, from the external computing system to a control system of the electrified vehicle, the sets of optimized parameters, wherein receipt of the sets of optimized parameters cause the control system to control the electric motor based on the sets of optimized parameters to perform AEMD control, wherein the AEMD control involves determining a measured speed of the electric motor, passing the measured speed through a low-pass filter and then through a high-pass filter to obtain a filtered speed, and applying a gain value to the filtered speed to obtain an AEMD torque that is summed with a commanded motor torque, and wherein the determining of the gain value is performed by approximating the virtual model as a simplified two degree-of-freedom (DOF) two inertia, spring system use the simplified two DOF two inertia, spring system to determine the gain value ($P_{AEMD}$) as:

$$P_{AEMD} = -2\omega_n(1 - \xi_{Driveline})J_{Tot},$$

where $J_{Tot}$ is a total inertia of the electrified powertrain, the driveline, and the vehicle at a location of the electric motor, $\omega_n$ is a natural frequency of the driveline, and $\xi_{Driveline}$ is a damping ratio of the driveline.

8. The AEMD calibration and control method of claim 7, wherein the set of optimized parameters includes (i) a cutoff frequency of the low-pass filter, (ii) a cutoff frequency of the high-pass filter, and (iii) the gain value.

9. The AEMD calibration and control method of claim 8, wherein the set of optimized parameters further includes non-constant or variable AEMD torque margins for corresponding varying operating conditions of the electrified vehicle.

10. The AEMD calibration and control method of claim 8, wherein the determining of the cutoff frequencies of the low-pass and high-pass filters is performed based on a three cycle average of a time-series signal of motor speed versus time.

11. The AEMD calibration and control method of claim 7, wherein the damping ratio of the driveline $\xi_{Driveline}$ is calculated based on a stiffness of the driveline ($K_{Driveline}$), which is calculatable as follows:

$$K_{Driveline} = J_{Tot} * (\omega_n)^2.$$

12. The AEMD calibration and control method of claim 7, wherein the electric motor is associated with a rear axle of the driveline, and wherein the electrified powertrain further comprises another electric motor associated with a front axle of the driveline.

* * * * *